(12) United States Patent
Petride et al.

(10) Patent No.: US 7,933,933 B2
(45) Date of Patent: Apr. 26, 2011

(54) FAST PATH LOADING OF XML DATA

(75) Inventors: Sabina Petride, Menlo Park, CA (US);
Sivasankaran Chandrasekar, Palo Alto, CA (US); Ellen Batbouta, Hollis, NH (US); Sam Idicula, San Jose, CA (US); Asha Tarachandani, Newark, CA (US); Bhushan Khaladkar, Mountain View, CA (US); Nipun Agarwal, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 691 days.

(21) Appl. No.: 11/840,858

(22) Filed: Aug. 17, 2007

(65) Prior Publication Data

US 2009/0037368 A1    Feb. 5, 2009

Related U.S. Application Data

(60) Provisional application No. 60/952,822, filed on Jul. 30, 2007.

(51) Int. Cl.
*G06F 17/30* (2006.01)

(52) U.S. Cl. ........................................ 707/803; 707/756

(58) Field of Classification Search ........ 707/100–104.1, 707/200, 201, 204, 602, 661, 755, 756, 792, 707/803, 808, 809
See application file for complete search history.

(56) References Cited

U.S. PATENT DOCUMENTS

| | | | | |
|---|---|---|---|---|
| 7,350,199 | B2* | 3/2008 | Ito et al. | 717/141 |
| 7,383,271 | B2* | 6/2008 | Yip et al. | 1/1 |
| 7,627,589 | B2* | 12/2009 | Cheslow | 1/1 |
| 7,647,552 | B2* | 1/2010 | Wan | 715/234 |
| 2005/0014494 | A1* | 1/2005 | Owen et al. | 455/419 |
| 2006/0168513 | A1* | 7/2006 | Coulson et al. | 715/513 |
| 2007/0061345 | A1* | 3/2007 | Thompson et al. | 707/100 |
| 2007/0083542 | A1* | 4/2007 | Agrawal et al. | 707/102 |
| 2007/0136254 | A1* | 6/2007 | Choi et al. | 707/3 |
| 2008/0098001 | A1* | 4/2008 | Gupta et al. | 707/10 |
| 2008/0120351 | A1* | 5/2008 | Khaladkar et al. | 707/204 |

OTHER PUBLICATIONS

Oracle, "Oracle XDK (10.1.2.0.2) Technical Overview", An Oracle White Paper, Sep. 2005, 15 pages.

* cited by examiner

*Primary Examiner* — Cam-Linh Nguyen
(74) *Attorney, Agent, or Firm* — Hickman Palermo Truong & Becker LLP

(57) ABSTRACT

Techniques for implementing fast loading of binary XML into a binary XML database repository are provided. A client application reduces the processing burden on the repository by doing pre-processing of the binary XML data prior to loading.

22 Claims, 3 Drawing Sheets system 100

FAST PATH LOADING OF XML DATA

CROSS-REFERENCE TO RELATED APPLICATIONS

This application claims priority to U.S. Provisional Application No. 60/952,822, which was filed on Jul. 30, 2007, the entire contents of which is incorporated by reference.

FIELD OF THE INVENTION

This application is related to database systems, and in particular, to techniques for quickly loading binary XML into an XML database repository.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Extensible Markup Language ("XML") describes and provides structure to a body of data, such as a file or data packet. The XML standard provides for tags that delimit sections of XML data referred to as XML elements. HTML is a form of XML.

An XML element may contain various types of data, including attributes and other elements. XML documents are typically quite verbose in that they can contain a large number of repeated start tags, end tags, and whitespaces. Although the XML text format is designed for readability, it was not designed for efficient data storage or data transmission.

To address this, binary XML is one format in which XML data can be stored in a database or XML repository (XR). Binary XML is a compact binary representation of XML that was designed to reduce the size of XML documents. When stored in binary format, an XML document consumes much less space than is required by other formats of XML storage. However, this space savings is achieved at the cost of additional processing overhead required to convert textual XML to binary XML, and to convert binary XML back into textual XML.

Although reference is sometimes made to a single "binary XML", XML data may be stored in multiple, proprietary binary formats. One of these formats represents strings ("tokens") with fixed values. In this implementation of binary XML, a mapping is established between tokens and replacement values, where the tokens are tag names, and the replacement values are numbers. Such mappings for a set of XML data, such as an XML document, are referred to herein as a "token vocabulary." Once a token vocabulary has been created, XML documents may be stored in binary XML based on the token vocabulary. In typical implementations of binary XML, even symbols such as "<", ">", and "/" can be represented by binary replacement values.

The number of businesses exchanging information electronically is proliferating. Businesses that exchange information have recognized the need for a common standard for representing data. XML is rapidly becoming that common standard. As stated, XML data is sometimes stored in an XML repository. However, if the burden of encoding the data into XML is imposed on the XML repository, valuable CPU resources must be dedicated to this task. Consequently, an improved mechanism for loading XML data into an XML repository is desired.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1:
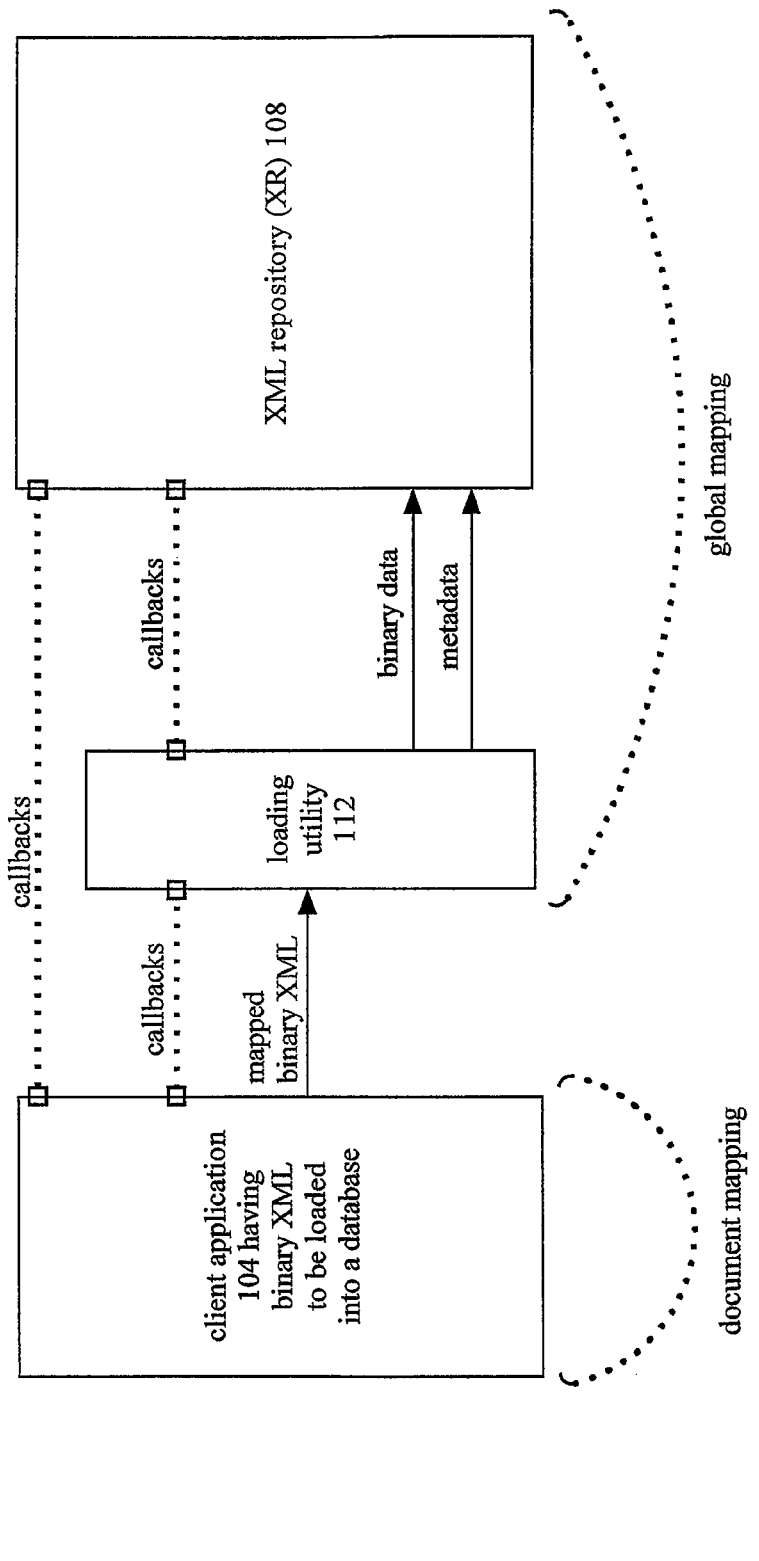
FIG. 1 is a block diagram of an example embodiment of the present invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Binary XML

Encoding mechanisms for loading binary XML documents into repositories fall in two categories: (1) self-contained encoded XML, and (2) context-based encoded XML.

Category (1) self-contained encoded XML is where each chunk of encoded data is preceded by mapping information sufficient for decoding that chunk of data.

Category (2) context-based encoded XML maintains such mapping information for multiple encoded XML documents in the XML repository level as well, but separate from the encoded XML documents. For example, binary XML systems encode text XML data by replacing verbose text data with numbers (numerical identifiers or IDs). These mappings between text data (also called tokens) and IDs have to be stored into separate tables (called token tables) in an XML repository. When queries are performed against the loaded tables, these tables will then be used to map back the numerical IDs to text. In case of schema-based XML data, the mappings are also determined by the schema annotations. Token tables are thus shared resources, and have the typical contention problems for such resources. These contention problems can be solved by locking portions of the tables.

While category (1) may be simpler to implement, it has the disadvantage of bloating the size of the encoded XML data. This is because decoding self-contained encoded XML requires remapping chunk-level metadata to bring the loaded data inline with the metadata already residing within an XML repository. However, category (1) has the advantage that the client application 104 never needs to communicate with the XML repository 108.

Meanwhile, category (2) maintains good encoding and timing of queries issued on the XML data within a given repository. An embodiment of the present invention is optimized to work in an environment which implements category (2), but can also accommodate category (1).

To determine whether category (1) or (2) is suitable, it is important to note that XML repository data structures for storing mappings are often shared by multiple users. Thus, any operation that involves encoding XML data in parallel with loading XML data into a repository generates mappings. This could potentially lead to inconsistent encoding, as there is a danger that a loading operation needs the mappings that are already generated by a parallel operation, but ends up duplicating metadata if the other session has not loaded the metadata into the XML repository.

One approach to solving this resource contention issue is to lock the repository structures storing meta information in exclusive mode, at the beginning of each loading cycle. This ensures that no meta information is added to the XML repository 108 during the loading process. The benefit is that the XML routines will load all meta information into the locked XML repository structures, and only unlock these structures when the loading process is complete. However, keeping the lock throughout the entire loading process is counterproductive, because doing so precludes parallel loads as well as parallel access to the metadata table structures within the XML repository 108.

This approach also has the disadvantage of potentially disallowing loading of data into partitioned encoded XML tables, where sessions may access encoded XML data for loaded rows in parallel with other rows being loaded. In such a case, the metadata needs to be present in all rows already loaded within the XML repository 108. Disallowing the loading of data is unwanted and preferred to be avoided.

OVERVIEW

An example system 100 of the present invention is shown in FIG. 1, where raw XML data resides in a client application 104. A loading utility 112 assists in moving the binary XML from the client application 104 to an XML repository 108. It is desired to load the binary XML data using the same loading utility 112 regardless of the specific format of binary XML being used, and is also desired to increase the speed at which XML data is loaded. To achieve this, the loading utility 112 is indifferent to the specific type of binary XML being used.

In repository-side encoding, XML data is sent from a client across a common link to the XML repository as mere text, where it is then parsed and encoded on by the repository. This approach has the problem that XML text is sent across a communication network raw and unencoded, thereby consuming network bandwidth. Also, at the site of the XML repository 108, the encoding process consumes resources. As stated, the system 100 seeks to reduce the use of the resources of the XML repository 108.

Accordingly, within the system 100, XML data is instead encoded at the client application 104 and then copied directly onto storage segments of the XML repository 108, where it is then committed into the repository when appropriate. Doing so results in improved loading speed. However, it also creates higher obligations on the client application 104 and loading utility 112 in preparing the data. The invention described herein a technique for quickly loading XML data in any encoded format.

As shown in FIG. 1, the system 100 has two mapping phases. These include a document mapping phase that occurs on a client side, and a global mapping phase that occurs on a repository side. At the client side, text XML data can be encoded to a format suitable for the XML repository 108, using either category (1) or (2) described earlier. At the global mapping phase, loading techniques use XML specific metadata (schemas, datatype definitions (DTDs), encoding format, etc.) to commit the binary XML into the XML repository 108.

One focus of the system 100 is to offload a processing burden from the XML repository 108. For example, if numerous client applications 104 are attempting to load XML data to the repository, a bottleneck situation results. A potential solution is to offload work from the XML repository 108 to the client application 104 and loading utility 112 where feasible.

To achieve this, the loading utility 112 understands XML at the client side, but must not need lots of info about the XML doc, and also must not need to know too much about the XML repository. Otherwise, the loading utility 112 becomes too large and complex. Minimizing requests for information from the XML repository 108 is desired. The client application 104 must understand what type of XML is being loaded, but the loading utility 112 need not know this.

Binary XML data provided by the client application 104 must be encoded before being pushed into the storage segments of the XML repository 108. In an example embodiment, the encoding is implemented in an XML callback invoked by the loading utility 112, as symbolized by the callbacks between the loading utility 112 and the XML repository 108 as shown in FIG. 1.

The loading utility 112 can be indifferent to the specifics of any binary XML encoding format. In particular, the loading utility 112 need not be aware of the exact timing of when encoding is done, or of the exact length of the encoded data.

Mappings can also be shared across multiple XML documents. However, the exact criteria for sharing mappings is specific to the encoding methods used; for example, documents conforming to the same XML schema or datatype definition (DTD) tend to share most mappings. Accordingly, the callbacks shown in FIG. 1 need to maintain a separate context for mappings and, at appropriate times during loading, connect to the XML repository 108 and populate it with mappings generated during the document mapping process.

The system 100 avoids creating large SQL statements. Instead, at the document mapping stage (FIG. 1), the system 100 pushes the data as characters or bytes directly onto storage segments of the token tables within the XML repository 108. To achieve this, the loading utility 112 must know about the structure of the token tables, but in doing so preferably avoids making queries on the XML repository 108 to obtain this information. However, there are instances in which such queries are necessary.

Within the system 100, the loading utility 112 can implement various types of callbacks, or means of communicating with the client application 104, as well as potentially the XML repository 108, as symbolized by the dotted lines within FIG. 1. Some examples of the functionality of these callbacks might be "want more data", "not going to push all data onto XML repository at the same time", "done with a row", "only want this amount of data", "had a problem converting the binary XML", and potentially others, although the present invention should not be considered as limited exclusively thereto.

It is also desired to avoid creating separate numbered representations for the same XML tag. To address this, the system 100 of the present invention includes shared (parallel) resources, such as but not limited to tables that store the document level mappings between XML tags and numbers.

Within the system 100, the client application 104 has a choice to either produce bytes (push), or wait to be asked for bytes (pull). To accommodate this, the loading utility 112 must understand both push and pull types of architectures.

As shown in FIG. 1, the client application 104 communicates with both the loading utility 112 and the XML repository 108. One way to achieve this communication is using callbacks transmitting messages including but not limited to: "this is XML binary, tell XML repository to expect a load of data at the nth row"; "tell the loading utility done processing this document"; "tell the loading utility done processing this document, and have consumed XXX bytes"; and potentially "is any locking needed?"

To carry out these callbacks, the loading utility 112 must be aware of the shared resources within the XML repository 108 that need to be locked, what type of granularity is needed to perform the step of locking, and what to do when an error occurs.

Multi-Threaded Embodiment

Figure 2:
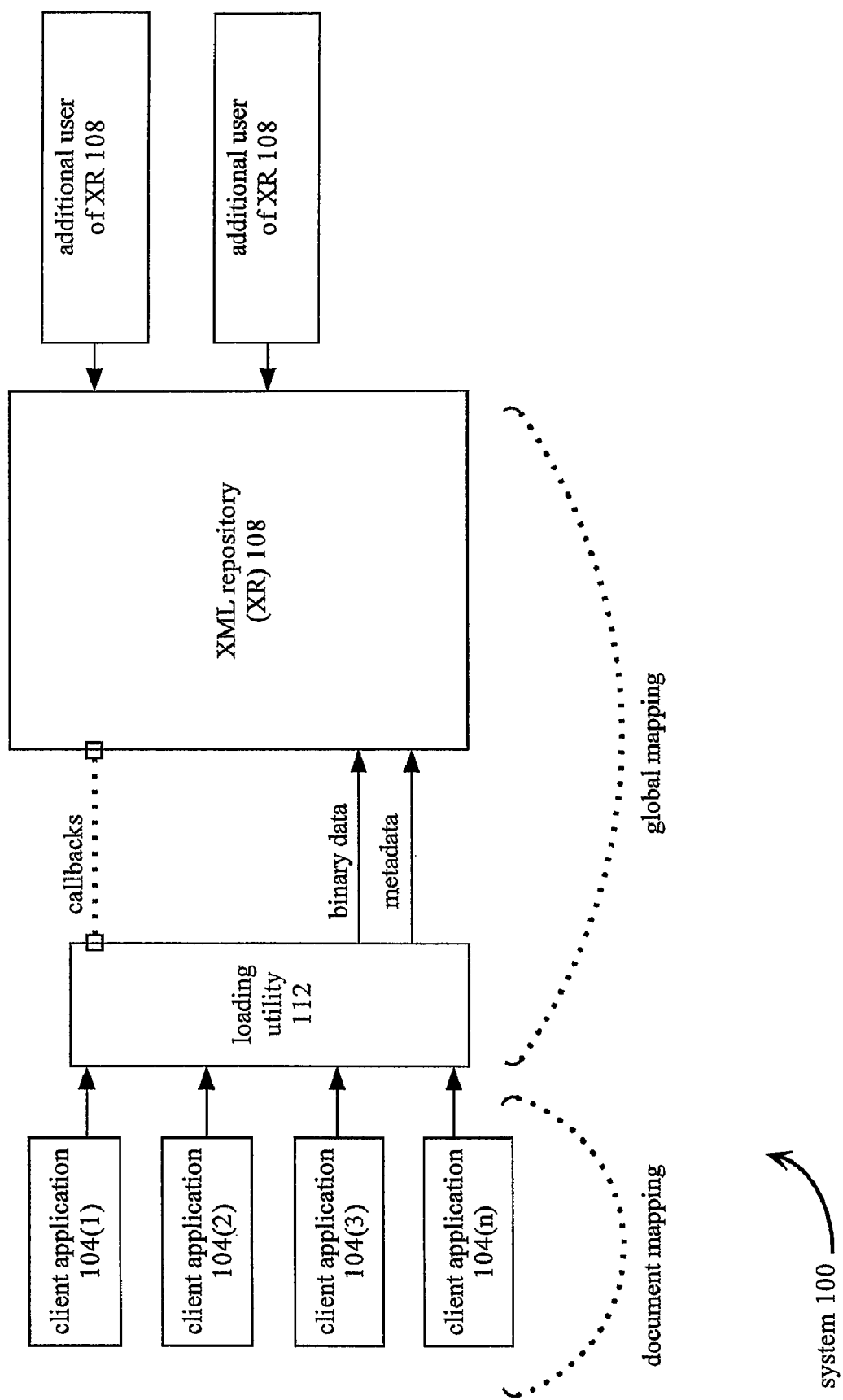
FIG. 2 is a modification of the embodiment of FIG. 1.

Another feature of the present invention is shown in FIG. 2, in which multiple client applications $104_{1-n}$ are shown. A single client application 104 with multiple XML documents being loaded would also fit these circumstances. This is because in both cases the loading routine 112 must accept multiple threads simultaneously, and must load data into different segments of the XML repository 108 at same time with no contention, thereby accommodating parallelism. FIG. 2 also shows that other users of the XML repository 108 unrelated to the system 100 may also require attention and processing resources.

However, parallelizing the loading process should not break the concurrency (integrity) of the loaded data. Using FIG. 2 as an example, while one client application $104_1$ is finishing loading into the XML repository 108, another client application $104_2$ may be still loading. The finished client application $104_1$ may then want to query the recently loaded data. It is desired to permit this query to take place while the unfinished client application $104_2$ is still loading data, yet do so while avoiding a conflict with the shared resources of the XML repository 108.

Locking

To ensure that no conflict occurs, portions of the XML repository 108 can be locked. However, it is also desired to minimize locking of the XML repository 108, because locking causes a single resource to be the only resource to have access to a portion of the XML repository 108, thereby eroding its parallelism. For example, when a client application 104 is busy encoding XML data, but has not loaded the encoded data to the XML repository 108, there is no reason to lock resources. When the shared resources are unlocked, the parallelism of the XML repository 108 is not broken. The loading utility 112 knows to communicate the encoded data, and will know when to request locks.

Additionally, the client application 104 can look ahead at data being encoded during the document mapping process, and suggest whether there will be contention or not. For example, if the client application 104 keeps seeing the same tags, that client application 104 will know that contention is unlikely, as the contention was resolved the last time this set of data came up. However, this duty of detecting contentions is on the client application 104, as the loading routine 112 will not check/verify.

Many XML documents are instances of the same XML schema. It is necessary to lock resources within the XML repository 108 only the first time an instance of the XML schema is loaded. This way, the resources of the XML repository 108 won't have to re-commit the same data, because it already has the mappings from the earlier occurrence.

Binary XML can also be used to encode documents that can have multiple schemas. The system 100 can accommodate this also.

Encoding non schema-based (schema-less) documents can involve the most locking and is thus the least efficient use of the system 100. In such a situation, the client application 104 instructs the loading utility 112 to load all binary XML documents in the same loading session without interruption. This way, the loading utility 112 keeps a state of what document mappings it has seen already.

Another way to address this is for the client application 104, in taking the text data and making it XML, can also be intelligent and remember the familiar document mappings. This can be done by keeping a state of the binary XML document, such as but not limited to using caches or hash tables.

Within the system 100, there are at least two ways for the client application 104 to process document mappings. A first way is that the client application 104 can know nothing about mappings within the XML repository 108, but instead create its own mappings. Accordingly, the XML repository 108 is relieved of some processing burden, because the XML data already contains its own mappings. It is desired to not put these mappings directly into the tables of the XML repository 108 however, because there could be contention.

Another less efficient way is where the XML data is unmapped entirely. As shown in FIG. 1, it is possible for the client application 104 to communicate directly with the XML repository 108 using callbacks, including providing warnings to a cache associated with the XML repository 108 about the status of incoming data. This would speed up the loading process, at the expense of consuming resources of the XML repository 108. Accordingly, it is desired to keep this warning/communicating to a minimum, because one of the purposes of the invention is to not consume resources of the XML repository 108.

The least efficient use of the system 100 is where the client application 104 is processing text data and is not communicating with the XML repository 108 at all, which is why FIG. 1 shows the callback between the application 104 and XML repository 108 as a dotted line, meaning optional. This would be an example of category (1) referred to earlier. The client application 104 creates its own mappings. The loading utility 112 then communicates to the XML repository 108 "mappings are forthcoming, please lock". The XML repository 108 locks, and accepts the mappings, but does no remapping, because all mappings are self-contained. The XML repository 108 then releases the lock.

In this sequence, the actual remapping step does not occur until the first time a user queries this self-contained data. Remapping then occurs, but only needs to occur once. This is known as lazy remapping. Remapping occurs at the repository level, and only after unlocking. Lazy remapping only occurs in the embodiment of the system 100 where the XML repository 108 does not communicate with the client application 104.

The system 100 of the present invention locks and unlocks token tables only on a per need basis. The token tables are kept unlocked as long as no new mappings are generated during encoding. The token tables are only locked when the 1st such item of new information is encountered, and are unlocked as soon as the current row is loaded. The loading utility 112 can push the data to the XML repository 108 in an asynchronous manner.

Configurable Data Sizes

An example embodiment of the loading utility 112 has a feature to request at most S bytes at a time from the client application 104. The client application 104 can respond with exactly S bytes, and indicate whether or not more data is needed to guarantee that a complete and valid XML document has been fully encoded. The client application 104 can also respond with less than S bytes and indicate that no more data is needed.

Within the system 100, the size S of data blocks being loaded can also be internally tuned, depending on the architectural specifics of the XML repository 108. This is true for both the client application 104 and the loading utility 112. Also, as only S bytes of encoded XML data need to reside in memory at any given time, the system 100 avoids creating a DOM-like representation of the XML input documents, which in turn allows fast loading of potentially very large documents To reduce locking and achieve increase, it can be advantageous to "tune" the size of the chunks of XML data getting ready to be encoded. This is partly because locking is more costly use of XML repository 108 resources than having the XML repository 108 look at mappings. One way to achieve this is for the loading utility 112 to have tuning parameters, settable by the user, or itself is sufficiently intelligent to note that locking is occurring too often, so that efficiency is being driven down.

The loading utility 112 would then tell the client application 104 to increase or decrease the chunksize. The loading utility 112 communicating with the client application 104 causes more overhead, but is not considered as much of a problem as burdening the XML repository 108. The client application 104 may also have a mechanism for detecting excessive locking, or excessive filesizes, and adjust the size of the chunksize accordingly.

Data Control File

The client application 104 can utilize a data control file in order to communicate to the loading utility 112 where is the beginning of the binary XML file to be loaded, although the system 100 is not limited to this feature. The loading utility 112 passes bytes of XML data to the XML repository 108, and in doing so may specify a certain number of rows. The loading utility 112 also tells what is the type of data to be stored within the shared resources of the XML repository 108.

Within the system 100, it is only necessary to load the mappings consecutively, but not the binary data. The binary data can be asynchronously loaded. In other words, the mapping portions of the XML must be loaded in sequence. However, the binary non-mapping portions can be loaded in any order, such as $1^{st}$, $2^{nd}$, $7^{th}$, $9^{th}$, then $4^{th}$, etc.

Hardware Overview

Figure 3:
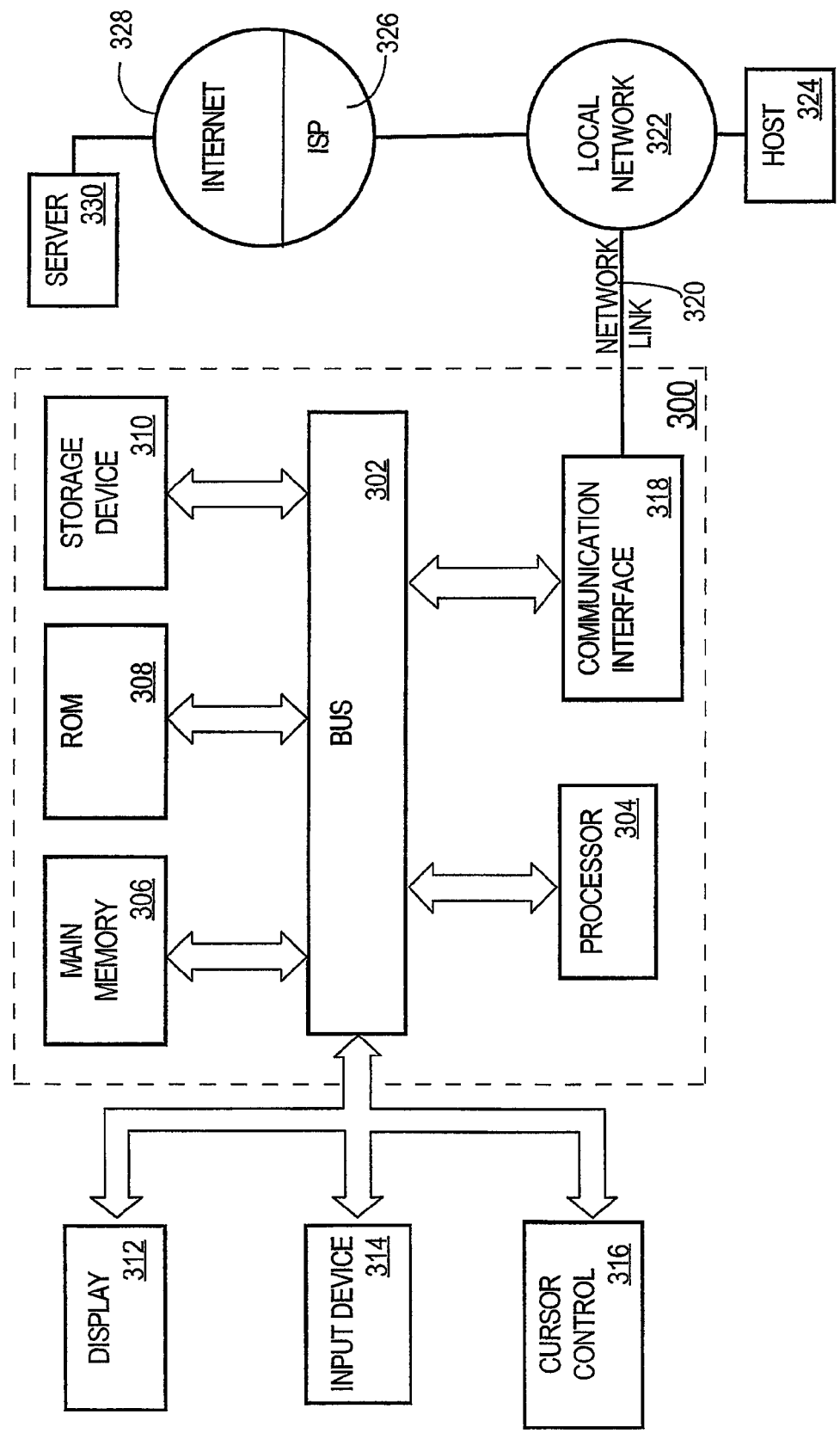
FIG. 3 is a block diagram of a computer system upon which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to an embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318 carry the digital data to and from computer system 300.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising steps of:
a XML repository storing global mappings for encoding XML documents to store in the XML repository, wherein said global mappings map replacement values to tag names in the XML documents;
said XML repository encoding XML documents to generate a collection of encoded XML documents that are stored in said XML repository, wherein said encoding includes replacing tag names with respective replacement values that are mapped to said tag names by said global mapping stored in said XML repository;
said XML repository decoding said XML documents according to the global mappings;
while said collection of encoded XML documents are stored in said XML repository, receiving a client encoded XML document encoded at a client application according to said global mappings; and
adding the client encoded XML document generated by the client application to the collection of encoded XML documents stored in said XML repository;
wherein the steps are performed by one or more computing devices.

2. The method of claim 1, further comprising: in response to receiving a client encoded XML document:
modifying the global mappings within the XML repository based on the encoded XML document; and
committing the global mappings within the repository.

3. The method of claim 2, further comprising:
locking portions of the repository prior to the step of modifying.

4. The method of claim 3, further comprising:
unlocking portions of the repository when the modifying step is completed.

5. The method of claim 1, wherein the step of adding further comprises loading subsets of the client encoded XML document.

6. The method of claim 5, further comprising:
locking portions of the XML repository prior to the step of loading subsets.

7. The method of claim 6, further comprising:
measuring the amount of locking that is occurring; and
adjusting the size of the subsets.

8. The method of claim 7, wherein a plurality of adjusting parameters are settable by a user.

9. The method of claim 1, wherein the client application can either transmit the client encoded XML document in a push mode, or wait to be asked for bytes in a pull mode.

10. The method of claim 1, further comprising:
maintaining a history of encoded XML document data mappings that have already been generated; and
forgoing locking the repository for those mappings present in the history.

11. The method of claim 1, wherein the step of encoding is performed by a callback invoked by the loading utility.

12. A non-transitory computer-readable medium storing one or more sequences of instructions, wherein execution of the one or more sequences of instructions by one or more processors causes the one or more processors to perform the steps of:
a XML repository storing global mappings for encoding XML documents to store in the XML repository, wherein said global mappings map replacement values to tag names in the XML documents;
said XML repository encoding XML documents to generate a collection of encoded XML documents that are stored in said XML repository, wherein said encoding includes replacing tag names with respective replacement values that are mapped to said tag names by said global mapping stored in said XML repository;
said XML repository decoding said XML documents according to the global mappings;
while said collection of encoded XML documents are stored in said XML repository, receiving a client encoded XML document encoded at a client application according to said global mappings; and
adding the client encoded XML document generated by the client application to the collection of encoded XML documents stored in said XML repository;
wherein the steps are performed by one or more computing devices.

13. The non-transitory computer-readable medium of claim 12, the steps further comprising: in response to receiving a client encoded XML document:
    modifying the global mappings within the XML repository based on the encoded XML document; and
    committing the global mappings within the repository.

14. The non-transitory computer-readable medium of claim 13, the steps further comprising:
    locking portions of the repository prior to the step of modifying.

15. The non-transitory computer-readable medium of claim 14, the steps further comprising:
    unlocking portions of the repository when the modifying step is completed.

16. The non-transitory computer-readable medium of claim 12, wherein the step of adding further comprises loading subsets of the client encoded XML document.

17. The non-transitory computer-readable medium of claim 16, the steps further comprising:
    locking portions of the XML repository prior to the step of loading subsets.

18. The non-transitory computer-readable medium of claim 17, the steps further comprising:
    measuring the amount of locking that is occurring; and
    adjusting the size of the subsets.

19. The non-transitory computer-readable medium of claim 18, wherein a plurality of adjusting parameters are settable by a user.

20. The non-transitory computer-readable medium of claim 12, wherein the client application can either transmit the client encoded XML document in a push mode, or wait to be asked for bytes in a pull mode.

21. The non-transitory computer-readable medium of claim 12, the steps further comprising:
    maintaining a history of encoded XML document data mappings that have already been generated; and
    forgoing locking the repository for those mappings present in the history.

22. The non-transitory computer-readable medium of claim 12, wherein the step of encoding is performed by a callback invoked by the loading utility.

* * * * *